United States Patent [19]

Pearson

[11] Patent Number: 4,530,153
[45] Date of Patent: Jul. 23, 1985

[54] MANUFACTURING RECOMBINATION ELECTRIC STORAGE CELLS

[75] Inventor: Ernest J. Pearson, Swinton, England

[73] Assignee: Chloride Group Public Limited Company, London, England

[21] Appl. No.: 547,404

[22] Filed: Oct. 31, 1983

[30] Foreign Application Priority Data

Oct. 29, 1982 [GB] United Kingdom ................ 8230954

[51] Int. Cl.³ ........................................... H01M 10/12
[52] U.S. Cl. ................................... 29/623.1; 29/623.5; 204/2.1
[58] Field of Search .............. 204/2.1; 29/623.1, 623.5

[56] References Cited

U.S. PATENT DOCUMENTS 2,887,522 5/1959 MacKenzie ........................ 204/2.1
4,331,516 5/1982 Meighan ............................. 204/2.1
4,383,011 5/1983 McClelland et al. ........... 429/160 X Primary Examiner—Anthony Skapars
Attorney, Agent, or Firm—Finnegan, Henderson, Farabow, Garrett & Dunner

[57] ABSTRACT

A method of manufacturing a recombination electric storage cell includes pasting positive and negative electrodes with damp active electrode material and forming a cell pack of alternating positive and negative electrodes interleaved with separator material. The cell pack is inserted into a plastics bag while the active electrode material is still damp and the electrodes are then cured by subjecting them to a temperature in excess of 25° C. so as substantially to dry them while within the bag. The cell pack is then inserted into its final outer container.

11 Claims, 5 Drawing Figures

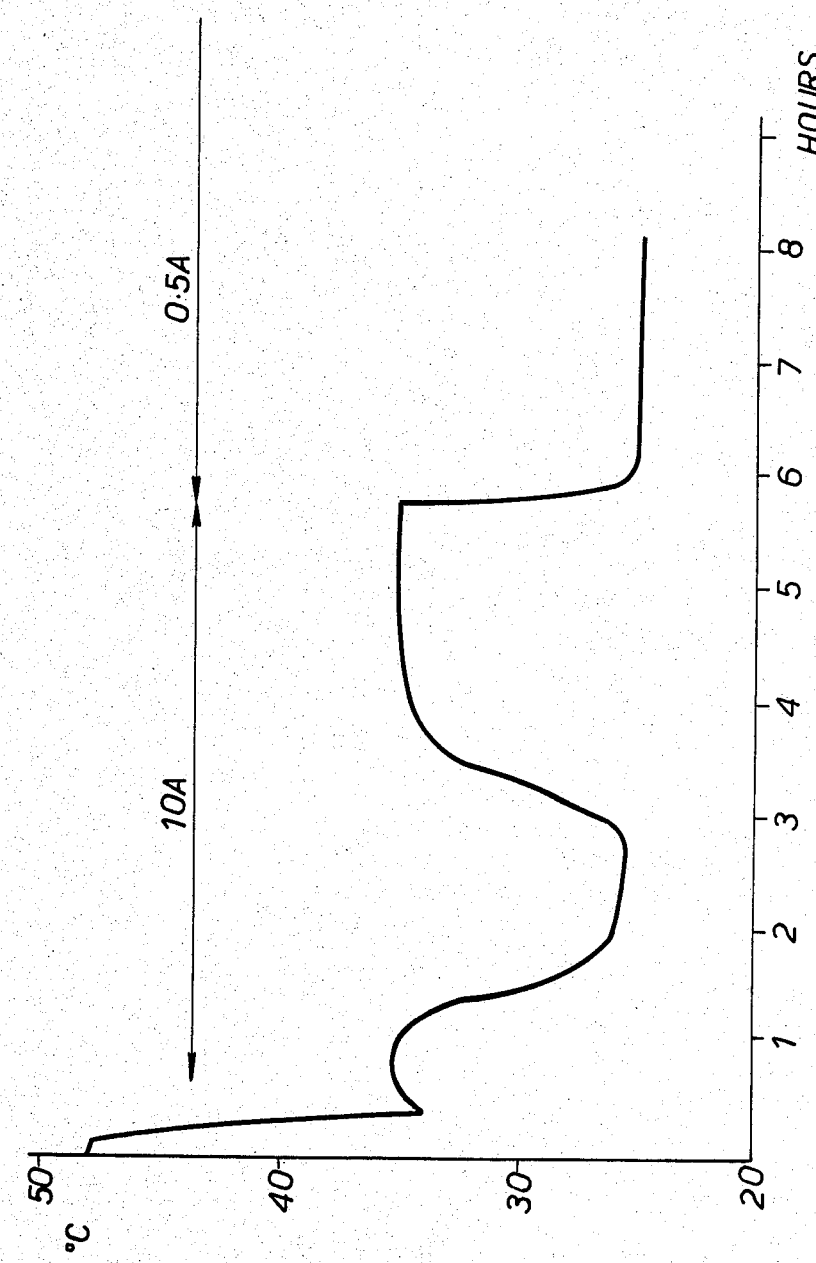

MANUFACTURING RECOMBINATION ELECTRIC STORAGE CELLS

The present invention relates to the manufacture of electric storage cells of the type containing substantially no mobile electrolyte, e.g. of recombination type, and batteries of such cells, in particular of lead acid type, and is concerned with the curing of the electrodes for such cells and batteries.

Recombination electric storage cells are those cells which contain substantially no free unabsorbed electrolyte and in which the gas evolved during operation or charging is normally induced to recombine within the cell and is thus not vented to the atmosphere.

When manufacturing lead acid cells and batteries other than of Plante type, e.g. automotive batteries, positive and negative electrode grids are pasted with damp positive and negative active electrode material respectively and the electrodes are then cured. Curing is the subjection of the electrodes to controlled conditions of heat and humidity so that free lead originally within the paste is oxidised and other chemical changes involving rearrangements of basic lead sulphate occur. During this process recrystallisation and cementation occurs along with corrosion and etching of the lead grid surfaces so that the active material becomes strong and firmly attached to the grid. Curing is normally carried out by stacking plates immediately after pasting into piles or on racks and then subjecting the mass of plates to a controlled atmosphere. Because the plates are wet, they need to be 'flash dried', i.e., subjected to a high temperature for a short time so as to prevent the plates sticking together.

Subsequent to curing, the electrodes are assembled into cell packs, that is to say packs of alternating positive and negative electrodes interleaved with separator material, and the cell packs are inserted into their final cell or battery container.

Either before or after the insertion of the cell packs into their final container, the cell packs must be formed, that is to say the active electrode material must be converted into its electrochemically active form. During this process the lead oxide on the positive and negative electrodes is oxidised to lead dioxide and reduced to spongy lead respectively. Formation may be performed prior to inserting the cell packs into their container in a formation tank containing sulphuric acid but this adds yet a further mechanical handling stage to the manufacturing process, that is to say the stacking of the electrodes in the formation tank and their subsequent removal and the subsequent cleaning and subsequent connection of the cell packs is expensive. It is therefore usual to form cell packs in their final container but this appreciably slows down the manufacturing process since formation results in the evolution of a substantial amount of heat and since the container, which is commonly of hard rubber, or polypropylene, polystyrene or ABS is a good thermal insulator this means that formation must be performed at a reduced rate to avoid overheating the electrodes. In addition, the outer container becomes soiled with dirt and/or electrolyte and thus requires washing and drying as a final step in the manufacturing process.

In conventional batteries of flooded electrolyte type it is essential that adjacent cells be electrolytically sealed from one another to avoid the occurrence of deleterious intercell ionic leakage currents and thus the containers for such batteries are provided with integral intercell partitions separating the container into sealed compartments. However, in batteries of recombination type it is found that such leakage currents do not constitute a major problem, the reason for which, it is believed, is that there is substantially no free electrolyte available for the conduction of the leakage currents.

British Patent Specification No. 2062945 of the present applicants discloses a recombination electric storage battery including a plurality of cell packs, each of which is accommodated in a respective open plastics bag, within a common uncompartmented outer container. Adjacent cells are thus separated only by two thicknesses of plastics film and communicate with a common head space beneath the lid but nevertheless intercell ionic leakage currents are found not to be a substantial problem.

It is an object of the present invention to provide a method of manufacturing a recombination electric storage cell or battery which involves a reduced amount of handling of the electrodes and in particular which reduces the handling of the electrodes at the curing stage.

According to the present invention a method of manufacturing an electric storage cell of the type including substantially no mobile electrolyte includes pasting positive and negative electrodes with damp active electrode material, forming a cell pack of alternating positive and negative electrodes interleaved with separator material, inserting the cell pack into a plastics bag whilst the active electrode material is still damp, subsequently curing the electrodes, e.g. by subjecting them to a temperature in excess of 25° C., so as substantially to dry them whilst within the bag, and thereafter inserting the cell pack into its final outer container. Preferably the cell is of recombination type and the separator material is compressible, fibrous and absorbent, e.g. microfine glass fibre material.

Thus in the method in accordance with the present invention the cell pack is assembled and placed in a plastics bag prior to being cured. The assembly step has, of course, in any event to be performed at some stage, but performing it prior to curing means that at the curing stage whole cell packs are handled rather than individual electrodes thereby substantially reducing the amount of handling which is required. In addition, the handling of the individual plates is performed whilst the active electrode materials are still damp which means that no air-borne lead oxide dust is formed which in the conventional manufacturing method can constitute a health hazard. Since the electrodes are interleaved with separator material whilst being cured, there is no risk of their sticking together and the flash drying can be reduced or eliminated. The porous nature of the separator also results in the plates being accessible to the atmosphere so that curing and drying can proceed at uniform and controlled rates, in contrast to the non uniform conditions that prevail in a normal plate stack during curing. After the curing process the active electrode materials are dry but the electrodes are then handled in the form of plate packs within a plastics bag thereby effectively eliminating the risk of lead oxide dust formation.

Whilst substantially surrounding the cell pack with a plastics bag may somewhat slow down the curing process since the evaporation of water is slightly impeded, it is found that this does not constitute a major problem. The precise temperature and time for which curing is effected will depend on the size and number of electrodes but typically the temperature will be in excess of 35° C. and the time in excess of 24 or 36 hours.

Electrolyte must of course be added to the cell pack prior to formation and whilst this may be done whilst the cell pack is in its final outer container electrolyte is preferably added to the cell pack subsequent to its being inserted into said plastics bag and prior to its being inserted into said outer container. In view of the fact that the cell is preferably of recombination type the electrolyte is preferably added in such an amount that in the finished cell there is substantially no free unabsorbed electrolyte and preferably insufficient electrolyte to saturate all the pores in the electrodes and separator material. In order to overcome the difficulties that may be experienced in adding electrolyte to a recombination cell in such a manner that all the separator material is adequately wetted it is preferred that the cell pack is constrained to occupy a volume less than its natural volume and that the cell pack is then immersed in electrolyte thereby substantially saturating said electrodes and said separator material. This is preferably effected by a method in which the cell pack is placed with its open end upwards in an electrolyte container, electrolyte is introduced into the electrolyte container to immerse the cell pack whereafter the cell pack is full with electrolyte up to the top of the plastics bag and excess electrolyte is drained from the electrolyte container.

Subsequent to curing, the cell pack must be formed and this may be effected in the final container. However, formation in the container suffers from the disadvantage referred to above and the formation is therefore preferably effected prior to insertion of the cell pack in the container. The plastics film around the cell pack is relatively thin, preferably less than 0.5 mm or 0.25 mm, and thus conducts heat relatively well. Preferably the electrodes are formed by passing electric current through them whilst the plastics bag is substantially surrounded by a volume of water, e.g. within a water bath. This enables the cell pack to be cooled very effectively whilst being formed which opens the way to a very rapid rate of formation since the heat evolved is rapidly dissipated into the water bath. Thus this method of formation has the advantages of both the conventional methods referred to above as regards ease of handling and speed without their disadvantages.

The invention also embraces a method of manufacturing a battery of cells of recombination type. After curing and optionally formation also, the cell packs may be inserted into a respective compartment in a compartmented container but preferably they are subsequently inserted into a common outer container having no fixed intercell partitions whereby adjacent cell packs are separated only by the material of the plastics bags in which they are accommodated.

When a battery is assembled in accordance with the present invention it is possible to achieve an even greater economy of handling and it is preferred that the adjacent cell packs are interconnected by one or more intercell connectors to form a battery pack prior to their formation. This enables whole battery packs rather than individual electrodes to be handled at the formation stage. This advantage is preferably obtained at the curing stage also by ensuring that adjacent cell packs are interconnected by an intercell connector to form a battery pack prior to their being cured.

If the cell packs include a plurality of separate electrodes of each polarity it is necessary at the time of forming the intercell connectors also to provide plate straps connecting together electrodes of the same polarity in each cell, but this is not necessary as a positive step in the method if the battery is of a type in which each electrode is one-half of a bipolar electrode which is integral with an electrode of opposite polarity in an adjacent cell pack or if each cell contains only a single electrode of each polarity, which single electrode may of course be folded one or more times. In the former case no positive method step is required also for the formation of the intercell connectors.

Further features and details of the invention will be apparent from the following description of certain specific embodiments which relate to a method of assembling a three cell 6 volt lead acid standby recombination storage battery which is given by way of example with reference to the accompanying diagrammatic drawings, in which:

FIG. 5 is a graph showing the variation of the temperature of the interior of the battery with time as the battery is formed.

Figure 1:
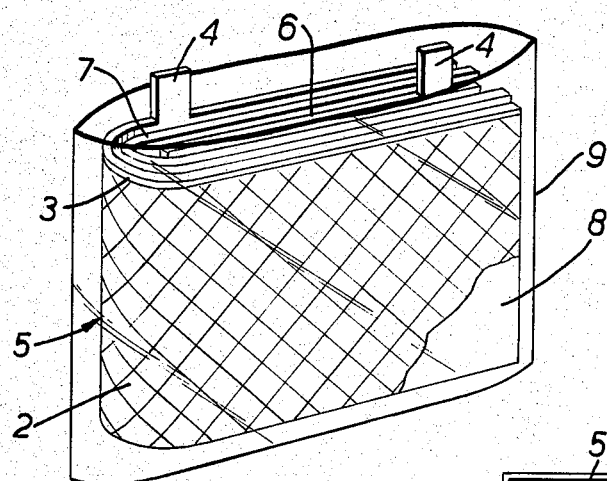
FIG. 1 is a perspective view of a single cell pack within a plastics bag.
Figure 2:
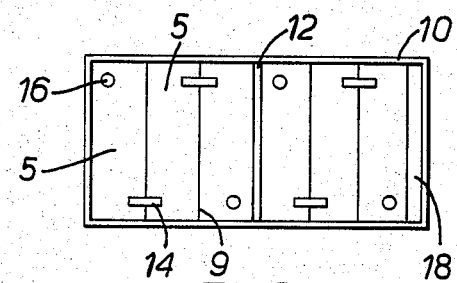
FIG. 2 is a plan view of six cell packs within an electrolyte container.

Referring first to FIGS. 1 and 2, a plurality of electrode grids of lead or lead alloy are formed by any conventional method, e.g. by casting or as in the present case, expanding a strip of lead or lead alloy and subsequently cutting it into individual grids. The grids are subsequently pasted with positive and negative active electrode material respectively, or alternatively with a single universal active electrode material. In this case each negative electrode 2 which is provided with a current take-off lug 4 about half way along its length is approximately twice as long as each positive electrode 6 which is provided with a current take-off lug 4 at one end. Each electrode is provided with a solid selvedge 3 along its upper edge with which the respective current take-off lug 4 is integral. The electrodes are then assembled whilst the active electrode material, of which a portion is designated 8, is still damp into cell packs 5, each of which comprises alternating positive and negative electrodes interleaved with compressible fibrous absorbent separator material 7, in this case microfine glass fibre material of the type disclosed in the prior specification referred to above. If each cell pack includes a plurality of both positive and negative electrodes of conventional rectangular type with an upstanding plate lug, plate straps are then formed connecting together plates of the same polarity in each cell pack and intercell connectors are formed also connecting together plate straps of one polarity in one cell with a plate strap of opposite polarity in an adjacent cell. However, in this embodiment each cell pack comprises a single electrode of each polarity and the negative electrode 2 is simply folded once around the positive electrode 6 as seen in FIG. 1. Thus in this construction no plate straps are required connecting together plates of the same polarity in the same cell. Each cell pack is then placed within a respective plastics bag 9.

The cell packs were then placed in an electrolyte container comprising a shallow rectangular tray 10 with apertures (not shown) formed in its base and side walls. The cell packs were grouped together in the configuration they are to adopt in the finished battery or batteries, in this case groups of three cell packs each, and adjacent groups of cell packs are separated in the electrolyte container by a respective spacer 12. The appropriate intercell connectors 14 are then formed within each group of cell packs by spot welding together adjacent pairs of current take-off lugs 4 over the tops of the intervening plastics bags thereby connecting the groups of cell packs together into battery packs. A terminal pillar 16 is formed around the current take-off lug 4 at each electrical end of each group of cell packs by any conventional method.

The cell packs were then cured by placing the entire container 10 into a recirculating oven whose temperature was 40° C. Moisture was seen to persist in the plastics bags for about twenty-four hours but after forty-eight hours the cell packs were found to be quite dry and the active electrode material appeared to be fully cemented, as indicated by a mechanical vibration test. Tests on the free lead content of the positive electrodes showed an initial free lead content of 12% by weight which reduced to 1.6% after curing. The electrodes were therefore judged to be satisfactorily cured and this was confirmed by subsequent formation and performance characteristics.

The container 10 was then removed from the oven and the cell packs compressed to between 50 and 75% of their natural volume by inserting a packing piece 18 into the container. The container was placed into a vacuum chamber which was then filled with electrolyte which entered the container 10 through the apertures in its walls thereby immersing the cell packs. A sub-atmospheric pressure was then applied to the vacuum chamber and subsequently released to promote an even wetting of the separator material. The electrolyte was then drained from the chamber and from the electrolyte container and the container was placed in a shallow water bath whose depth was slightly less than the height of the plastics bags. The battery packs were then electrolytically formed for e.g. 4 hours and were maintained cool by the water which entered the container 10 through the apertures in its walls.

The volume of electrolyte in each cell pack may be adjusted by varying the height of the plastics bags since each bag is full after immersion and/or by varying the amount by which the cell packs are compressed. Formation may be effected whilst the plastics bags are still full to the top with electrolyte but this may result in a certain splashing of the electrolyte and thus alternatively the packing piece 18 may be removed from the container prior to formation thereby reducing the compression of the cell packs and thus lowering the electrolyte level in the plastics bags. Rather more electrolyte is required for formation than under operation conditions and whilst any excess will ultimately be electrolysed off the excess may be simply squeezed out by further compressing the cell packs after formation.

Subsequently the battery packs were inserted into respective uncompartmented battery containers to which respective lids were then sealed. Each lid has a single vent common to all the cells. It will be appreciated that in the finished batteries adjacent cell packs are not separated by fixed intercell partitions but merely by the material of the plastics bags in which they are accommodated. By virtue of the fact that these bags are open at the top all the cells communicate with a common gas space and thus with the common vent but intercell ionic leakage currents do not occur since there is effectively no free electrolyte available for the conduction of such currents.

In one specific example the battery was formed at a current of 10 amps for 5½ hours and the formation current was then continued overnight for 13 hours at a reduced current of 0.5 amps. During formation the temperature in the interior of one cell was measured and this is shown in FIG. 5. As may be seen, the temperature was initially about 48° C. and this was due to the usual evolution of heat which occurs when adding sulphuric acid electrolyte to a dry cell pack. The temperature then fell relatively rapidly to about 34° C. as a result of the cooling effect of the water bath. The temperature then rose slightly due to the resistive heating effect which results from the fact that at an early stage in formation there are not enough active formation sites for the electric current to be efficiently converted and the excess is converted into thermal energy. After a short time, however, the formation proceeds increasingly rapidly and after about 1 hour the peak resistive heating was finished and formation proceeds efficiently. From this point the temperature fell to about 25° C. at which point nearly all the active material was converted to its active form which occurred after about three hours. After this, a decreasing proportion of the applied electrical energy is stored in chemical form and an increasing amount produces heat and the temperature thus increased again to about 35° C. After about four hours the heating effect ceased to increase and the temperature remained constant. When the formation current was reduced to 0.5 amps the temperature fell rapidly to about 24° C. by reason of the reduced resistive heating effect and then remained constant. Throughout the formation the temperature of the water bath was maintained at 18° C.

Figure 3:
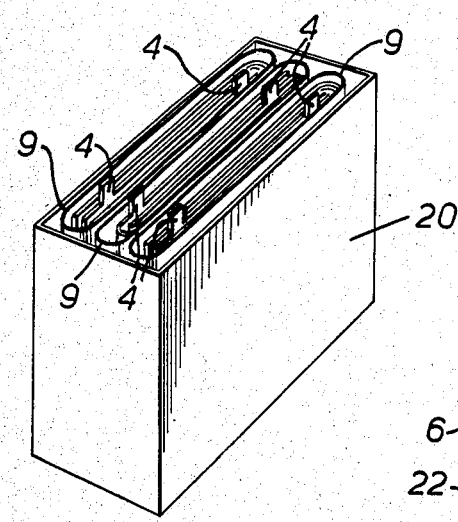
FIG. 3 is a perspective view of a battery of three cell packs within an outer container.

In a variant of the above method, the intercell connectors are not formed whilst the cell packs are in the electrolyte container and the cell packs are treated individually and then placed in an outer uncompartmented container 20 (seen in FIG. 3) whereafter the intercell connectors and terminal pillars are formed. In a further variant the intercell connectors are not formed by spot welding the lugs 4 above the plastics bags but by welding straight through the bags. This may be effected by forcing a piercing member through one lug and the plastics bags against a reaction member and then passing a substantial welding current between the piercing and welding members.

Figure 4:
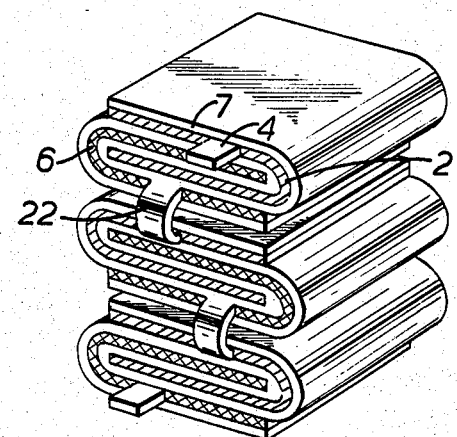
FIG. 4 is a perspective view of three integrally interconnected cell packs.

In a still further variant which is illustrated in FIG. 4 both the positive and negative electrodes in each cell are folded once and arranged so that the areas of each electrode alternate and are separated by separator material. Each electrode, with the exception of one electrode in each end cell pack, is integrally connected by a bridge piece 22 which constitutes an intercell connector to an electrode of opposite polarity in an adjacent cell pack. In this construction not only are plate straps not required but it is also unnecessary to form intercell connectors. Otherwise the method is the same as described above and it will be appreciated that the three plastics bags around the individual cell packs are not illustrated in FIG. 4.

During the formation of the cell packs a proportion of the electrolyte is electrolysed and thus gassed off. Nevertheless, it is found that in practice the finished battery may still contain a small excess of electrolyte and under these conditions the recombination mechanism of the battery is not particularly efficient. When the battery is charged and gassing occurs both hydrogen and oxygen are evolved initially and this is then lost through the vent. As the amount of electrolyte in the cell packs decreases the recombination mechanism becomes increasingly efficient and the amount of oxygen produced on gassing increases with respect to the amount of hydrogen. After a certain length of time substantially only oxygen is produced on gassing and this is then recombined within the battery.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. In a method of manufacturing an electric storage cell of the type containing positive and negative electrodes interleaved with separator material and substantially no mobile electrolyte, the improvement comprising pasting positive and negative electrodes with damp active electrode material, forming a cell pack of the electrodes having alternating positive and negative electrodes interleaved with separator material, inserting said cell pack into a plastic bag while the active electrode material is still damp, subsequently curing said electrodes so as substantially to dry them while the cell pack is within said bag, and thereafter inserting said cell pack into an outer container.

2. The method of claim 1 including adding electrolyte to said cell pack subsequent to the electrodes being cured and while the cell pack is within said bag prior to its being inserted into said outer container.

3. The method of claim 2 including compressing said cell pack to a volume less than its natural volume and then immersing the compressed cell pack in electrolyte thereby substantially saturating said electrodes and said separator material.

4. The method of claim 3 wherein said plastic bag has an open end and said cell pack is placed with said open end of the plastic bag upwards in an electrolyte container, introducing electrolyte into said electrolyte container to immerse said compressed cell pack whereby said cell pack is full with electrolyte up to the top of said plastic bag and then draining electrolyte from said electrolyte container.

5. The method of claim 3 wherein said cell pack is subjected to a subatmospheric pressure while immersed in said electrolyte.

6. The method of claim 2 wherein said electrodes are formed subsequent to the addition of electrolyte to the cell pack and while the cell pack is within said bag and prior to the cell pack being inserted into said outer container.

7. The method of claim 6 wherein said electrodes are formed by passing an electric current through them while said plastic bag is substantially surrounded by water.

8. The method of claim 1 wherein said cell is of recombination type and said separator material is a compressible, fibrous and absorbent material.

9. In a method of manufacturing a recombination multicell electric storage battery containing a plurality of cell packs, the improvement comprising manufacturing each cell pack of the battery by the method of claim 1 and subsequently inserting each cell pack into a common outer container having no fixed intercell partitions, whereby adjacent cell packs are separated only by the material of said plastic bags in which said cell packs are located.

10. The method of claim 9 wherein said cell packs are interconnected by one or more intercell connectors to form a battery pack prior to the formation of said cell packs.

11. The method of claim 9 wherein said cell packs are intereconnected by one or more intercell connectors to form a battery pack prior to said cell packs being cured.

* * * * *